3,401,138
PREPARATION OF POLYVINYL CHLORIDE PLASTISOLS AND PRODUCTS
David Ralph Brady, Grosse Pointe Farms, Mich., assignor, by mesne assignments, to Sheller-Globe Corporation, a corporation of Ohio
No Drawing. Filed June 15, 1966, Ser. No. 557,613
1 Claim. (Cl. 260—31.8)

This invention relates to a method of preparing polyvinyl chloride plastisols and to a variety of products that can be prepared with the plastisols. More particularly, the invention relates to the preparation of a plastisol which is of the cross-linking and irreversible thermosetting vinyl dispersion resin type and products which can be prepared with this plastisol by using it as a coating or impregnating material and the like.

In the past, conventional mixing of polyvinyl chloride dispersions or plastisols as herein described has resulted in plastisol formulations having a shelf life of only a few hours, for example less than about six hours. This in many instances has prevented broad commercial usage of plastisols where long shelf lives are either desired or necessitated. There has therefore long been sought in the art a method of preparing plastisols which may be used to set up and form rigid products, which plastisols have a long shelf life after they have been prepared and which plastisols also exhibit upon usage excellent properties such as high heat resistance, abrasion resistance, resistance to strong or weak acids and bases and the like.

One object of this invention is to provide an improved method of preparing polyvinyl chloride plastisols such that the plastisol, after its preparation, will have a markedly long shelf life.

Another object of the invention is to provide an improved polyvinyl chloride plastisol which when coated on or impregnated into a product, or which is used in the formation of laminated products, thereby endows said products with properties such as high heat resistance, resistance to strong and weak acids, alkalis, solvents, and abrasion.

Another object of the invention is to provide an improved method of preparing a polyvinyl chloride plastisol such that the plastisol, after it is thermoset, cured, or set up gives a rigid material which is highly heat resistant.

Another object of the invention is to provide improved products such as wall panels, plywood topping, hardwood flooring, molded auto parts, laminated articles, and the like, by using the plastisol of this invention as either an impregnating or coating material on a base article.

Another object of the invention is to provide improved products such as particle boards or the like, wherein the plastisol of this invention is allowed to cure or set up after a large amount of a suitable filler material has been incorporated into the plastisol.

Other objects, features and advantages of the present invention will become apparent from the subsequent description and the appended claim.

In its method aspect the present invention concerns the preparation of a polyvinyl chloride plastisol composition comprised of the following: (a) a polyvinyl chloride resin, (b) a primary plasticizer, (c) a secondary plasticizer, (d) 1,3-butylene dimethacrylate ester, which is a high boiling, low viscosity, monomeric ester that polymerizes to a cross-linking and thermoset polymer, upon use of the plastisol, (e) a stabilizer, (f) an activator to initiate the cross linking of the monomeric ester, (g) an ultra violet protector, and (h) an optical brightener. Broadly stated, the method comprises preparing the plastisol of the invention with the above constituents by mixing or compounding the ingredients together such that the temperature of the combined ingredients is always maintained below about 65° F. and preferably below about 50° F. More particularly, from a preferred aspect the method comprises the steps of (a) mixing the monomeric ester with the plasticizers, then mixing in the stabilizer, ultra violet protectors and optical brighteners. Next the catalyst is added to the mixture while thoroughly agitating in order to obtain uniformity and then the entire mixture is divided into approximately equal portions, to one of which portions the polyvinyl chloride resin is added in incremental amounts. The temperature throughout all the above steps is maintained below about 65° F. and preferably below about 50° F., and the remainder of the polyvinyl chloride resin is added at a rate such that the temperature does not exceed these limits. The final mixture is then put under a vacuum and deaerated.

Based on 500 parts by weight of the polyvinyl chloride resin, the combined content of primary and secondary plasticizers should be between about 125 and about 225 parts by weight, and the ratio of primary to secondary plasticizer should be about 2:1 plus or minus 10%; the amount of the monomeric ester 1,3-butylene dimethacrylate should be between about 225 and about 125 parts by weight; the stabilizer should be present in an amount of about 10 parts by weight; the activator should be present in an amount of about 5 parts by weight; the ultraviolet absorber should be present in an amount of about ½ part by weight; and the optical brightener should be present in an amount of about ½ part by weight.

In its product aspect, broadly stated the present invention comprises using the plastisol prepared as described above to either coat or impregnate any number of materials such as, for example, plastics, foam, wood, paper, rubber and the like, to form products incorporating the plastisol of this invention. These products can be molded, formed or shaped in accordance with the final configuration desired.

To more fully describe the invention, the following sets forth a description of the basic components used in the composition prepared in accordance with the method of the invention.

The polyvinyl chloride resin (PVC) used should be a high molecular weight type polyvinyl chloride dispersion resin preferably one having a polyvinyl chloride content of at least about 98.5%, an average particle size within the range of about 0.5 to about 2 microns, and a specific gravity of about 1.40.

The primary plasticizer used in the composition preferably is butyl benzyl phthalate; however, it is also possible to use other plasticizers such as dioctyl phthalate, dioctyl sebacate, phosphate or adipate type plasticizers and the like.

The secondary plasticizer used is a permanent type plasticizer. Particularly suitable for use as the secondary plasticizer is Monsanto plasticizer No. 480. This is a polymeric material with monomeric characteristics having the following properties:

| | |
|---|---|
| Acidity | 0.60 meg./100 g. max. |
| Appearance | clear, oily liquid. |
| Color, APHA | 150 max. |
| Moisture (KF in methanol) percent | 0.15 max. |
| Odor | Slight characteristic. |
| Refractive index (at 25° C.) | 1.4943. |
| Specific gravity (25/25° C.) | 1.046–1.052. |
| Density (lbs./gal. at 25° C.) | 8.72. |
| Pour point (° C.) | −1. |
| Viscosity cks: | |
| @25° C. | 556. |
| @37.8° C. | 243. |
| @98.9° C. | 21.2. |

Flash point, °F. _____ 475.
Fire point, °F. _____ 535.
Solubility in water (25° C.) ____ Practically insoluble.

The monomeric ester used in order to give the finished plastisol its rigid, and cross linked, thermoset characteristics is 1,3-butylene dimethacrylate. This ester is a high boiling low viscosity ester that can be polymerized by heating and/or catalysis to a cross linked or thermoset polymer when the plastisol is cured, or allowed to set up when used. This monomeric ester is available from Rohm & Haas Company (Monomer X–970) and the ester has the following properties: a purity of not less than about 98.9%, a specific gravity at 25° C. of 1.01, a refractive index at 25° C. of 1.45, a color in accordance with the APHA test of 50, and a percent water content of about 0.1% or less.

The stabilizer used in the composition should preferably be a barium-cadmium-zinc organic inhibitor composition. However, the particular stabilizer chosen is not critical and other stabilizer materials can satisfactorily be used, for example other barium-cadmium compositions and the like. The use of stabilizers greatly improves the heat stability and color of the plastisols prepared in accordance with this invention using the monomeric ester as above described.

The activator used in the composition may be, for example, selected from any of the following: benzyl peroxide, benzol peroxide butyl, perbenzoate, or the like. Of these, a particularly suitable activator for use in the composition is benzyl peroxide in tricresyl phosphate at a 50/50 ratio. This preferred catalyst is a paste type material (Luperco ATC).

The preferred ultra violet absorber or protector for use in this invention is 2(2′-hydroxy 5′-methylphenyl) benzoltriazole (HMPB). From a broad standpoint, however, other ultraviolet absorbers can satisfactorily be used and this will be apparent to artisans. Polyvinyl chloride is notably susceptible to degradation by ultra violet light. Exposure induces chemical reactions such as HCl elimination, cross linking, chain scission, oxidation and the like, all of which become physically evident as discoloration, embrittlement or general loss of desired physical properties. The use of an ultra violet absorber has been found to markedly improve stability of the rigid polyvinyl chloride products prepared in accordance with this invention, while at the same time unexpectedly removing the detriments to the products formed which result from exposure and the like as described above. The HMPB compound referred to has a molecular weight of 225, an appearance of off-white color, crystalline form, a melting point of about 129–130° C., and a boiling point of approximately 225° C. at 10 millimeters mercury.

The optical brightener used in the plastisol and products formed in accordance with the invention is a solvent soluble, completely organic fluorescent material comprised of a 2-(stilbyl-4″)-(4,5-arylo)-1,2,3-triazole compound. A more complete description of said material is found in U.S. Patent No. 2,784,184 of Zweidler et al. The optical brightener is white in color, a free flowing powder, with a melting point in the range of about 64° to about 110° C. The function of the optical brightener is to enhance whiteness and liven pastel shades while masking out yellow colors.

The method of the invention in more detailed description is as follows: The plasticizers are first blended into the monomeric ester using a mixer such as a Hobart Planetary type running at a low speed such as about 60 r.p.m.'s for a time period of about five minutes. The stabilizer is added to the plasticizer and monomeric ester and this is also mixed for a period of about five minutes at low mixing speed. The ultra violet absorber and the optical brightener are next added to the mixture of plasticizers, monomeric ester and stabilizer, while the mixing speed is continued at a low rate for a time period of about twenty minutes. Next, the catalyst is added to the mixture and thoroughly mixed in by agitating the mixture for a period of at least about 10 minutes at low mixing speed. Throughout the above series of steps the temperature is maintained below about 65° F. and preferably below about 50° F. While being certain to maintain the temperature below the above referred to limits, approximately ⅓ to ⅔, and preferably about one-half of the mixture is removed from the mixing vessel and the polyvinyl chloride resin is slowly introduced into the mixing vessel and blended until all lumps and particles are dispersed. The time period for adding polyvinyl chloride resin should not be less than about 30 minutes in order to avoid excessive temperature rise. It is critical that no increase in the temperature be allowed to occur at this point. The mixture is then placed in a vacuum chamber and entrapped air is removed by vacuum deaerating. The deaeration should be allowed to continue for approximately 30 minutes to remove any entrapped air therein and any reactionary gases. The portion of the material which had been removed prior to the adding polyvinyl chloride resin is then added incrementally to the deaerated paste and blended at a slow speed such that the temperature is controlled and maintained below the limits stated. The rate of incremental addition of the remaining material at this stage is determined by the criteria that the temperature should not rise above the stated limits. However, it has been determined preferable to add approximately half of the remaining material while blending at a low speed and then allowing the mixture to stand overnight. Then the last half of the remaining material is added while mixing for approximately 10 minutes. The completed polyvinyl chloride dispersion composition is then returned to the vacuum chamber and deaerated until all air is removed, and this point is determined by the observation of cold boiling which will cease when the air is removed.

In accordance with the above method of preparation, polyvinyl chloride dispersions containing the monomeric ester described have been obtained with shelf lives of a minimum of about two to three months. If the dispersions after their preparation as above described, are converted to organosols, their shelf life is measurably increased. A preferred diluent for converting the plastisol to an organosol is a medium polarity, non-solvating type of diluent, such as, ethylene glycol monoethyl ether acetate.

In order to further illustrate the invention, the following examples are provided. It is to be understood, however, that the examples are included for illustrative purposes and are not intended to be limiting of the scope of the invention as set forth in the subjoined claims.

Example 1

Parts by weight
(A) Polyvinyl chloride resin (98.5% PVC; 0.5–2 microns average particle size; and 1.4 spec. grav.) _____ 500
(B) Plasticizers:
    (1) Butyl benzyl phthalate plasticizer _____ 83.2
    (2) Monsanto No. 480 plasticizer (described above) _____ 41.8
(C) 1,3-butylene dimethacrylate ester _____ 225
(D) Barium-cadmium-zinc organic stabilizer _____ 10.5
(E) Benzyl peroxide in tricresyl phosphate at 50:50 ratio (activator) _____ 5.3
(F) HMPB ultraviolet absorber _____ 0.5
(G) Optical brightener 2-(stilbyl-4″)-(4,5-arylo)-1,2,3-triazole compound _____ 0.5

The above materials were formulated into a plastisol in the following manner. Step 1: Materials B and C were thoroughly blended in a Hobart Planetary type mixer running at a low speed of about 60 r.p.m. for five minutes. Step 2: Next there was added to B and C the material D which was also mixed for approximately five minutes at about the same low mixing speed. Step 3: Materials F and G were added to the mixture B, C, and D and since F and G were in powder form and hence slow to dissolve, the mixture was run for approximately 20 minutes at low speed. Step 4: Material E, the activator, was added to the above solution and thoroughly mixed for about ten minutes at low speed. The total amount of solution at this point was 366 grams and this was cooled to about 60° F., then half of the solution, i.e., 183 grams was removed from the mixing vessel. Step 5: The resin A was slowly introduced into the mixing vessel until all lumps and particles were dispersed. This required a blending time of about 30 minutes. The temperature during this time was carefully observed in order that there be no increase above 65° F., and to do this it was necessary to cool the mixing vessel to avoid the undesirable temperature increase. Step 6: The material in the mixing vessel at this point was placed in a vacuum vessel and entrapped air was removed by applying a vacuum with a Welch Duo-Seal, vacuum type pump, Model 1402. This vacuum operation required about 30 minutes and was necessary to remove entrapped air and any reactionary gases. Step 7: The material was then returned to the Hobart mixer and 90 grams of the material removed in Step 4 was added to the deaerated paste and blended at a slow speed for about 15 minutes, while the temperature was maintained at 65° F. or lower. Step 8: After allowing the material from Step 7 to stand overnight the remaining 93 grams of material removed in Step 4 was added and mixed on the Hobart mixer for 10 minutes, while maintaining the temperature at 65° F. or lower. Step 9: The mixture was then again returned to the vacuum chamber and deaerated until all air was removed, which was determined by the cessation of cold boiling.

The plastisol produced in accordance with the above described method was a polyvinyl chloride reactive monomeric dispersion that had an outstanding shelf life of a minimum of two to three months.

Example 2

Plastisol with polysol thinner:                    Parts by weight
    (1) Plastisol of Example 1 _____ 500
    (2) Polysol thinning agent (ethylene glycol
        mono-ethyl ether acetate) _____ 500

This produced a material with a viscosity comparable to a thin molasses. It reduced the neutonian quality of the plastisol of Example 1. The polysol does not destroy the cross-linking qualities of the primary formula nor does it increase its viscosity by solvation.

The 50:50 ratio was found suitable for spraying, coating, impregnation and many other applications.

Being of a moderate polarity, polysol is suitable for electrostatic application.

Further thinning is done to create molding powders and for impregnation of many porous types of substrates and cellular constructed materials.

Using a ratio of 10:90 it is possible to impregnate soft type wood, which then can be pressed, molded and curved into different shapes (flame retarded).

Example 3

Plastisol with zirconium oxide as a              Parts by weight
    filter:
    (1) Plastisol of Example 1 _____ 500
    (2) (Calcined Zirconium Oxide) No. 400
        mesh—600 seive size particles _____ 250

Mixing: (A) 100 pts. of component (C) of Example 1 was withheld and used to wet out the Zirconium material. 1% of a neutral pH wetting agent was introduced into this mixture. (B) The materials were then mixed on a slow speed revolving paddle type mixer (such as a Hobart) for 20 minutes up to one hour. (C) All air was removed and mixture was introduced into the formula of Example 1 at 65° F. or lower. (D) Mix or blend for 15 minutes. (E) Deaerate under vacuum until cold boiling stops. This material will cure out at 300 to 350° F. in 5 to 10 minutes. Allow heat penetration time for molds.

Example 4.—Method of preparing laminates (1) Fiber glass cloth was first flamed or washed to remove all roving oil and dirt. The glass was then treated with a material known as union carbide A 172 silane. The silane was prepared in a solution of 2% to 98% distilled water. The solution was adjusted to a pH of 8.5 to 9 by the addition of morpholine. The cloth was dried by heat in a coated drying tower at 325 to 357° F. temperature.

(2) The treated fiber glass was then run through a coating tank and coated with the plastisol formula of Example 1. Next the cloth was run through a coating dryer at 180° F. to gel and hold the formula to the fiberglass cloth. As the material is flexible at this stage it can be used for hand lay up, or it can be cut into strips and laminated into sheeting or board. A final cure was obtained at 350° F. for 5 to 8 minutes. Many diversified products can be produced from this basic material. Other types of fiber cloths can also be processed in accordance with the above.

Example 5

Parts by weight
Plastisol with woodchips as filler—particle board:
    (1) The plastisol of Example 1 was reduced with
        polysol at a 50:75 ratio _____ 500
    (2) Woodchips _____ 500

The thinned material (1) was placed in a tank and material (2) was added to make a slurry completely wetted throughout.

A vacuum pressure was applied to the tank of slurry to remove air from the cells of the wood. Approximately 25 pounds of vacuum pressure was used for five minutes. The slurry material was transferred to centrifugal type spinning unit to remove excess solution. Treated woodchips were dried to remove the polysol and treated to a gelling temperature of 180° F. for approximately five minutes. The treated chips were then molded into various shapes or pressed into sheets and cured at 350° F. for 5 to 10 minutes according to thickness desired. This technique is applicable also to other types of materials, such as woodfibers and the like. The particle board prepared in accordance with this example has high heat resistance, is non-warping and moldable.

Example 6

Parts by weight
Plastisol with stockpole magnetic filler:
    (1) The plastisol of Example 1 was reduced with
        polysol to a 50:50 ratio _____ 100
    (2) Stockpole magnetic filler (ferric barytes
        micron size particles) the magnetic filler was
        mixed with enough additional polysol to form
        a slurry and then added to No. 1 _____ 500

Mixing: (1) and (2) were mixed in a slow speed blender for approximately 10 minutes. Drying: The material was poured into a drying plate and dried. At this stage there forms a solid material, which was ground into a powder. Molding: The powder was next placed under compression in an aluminum cavity mold and the mold was subjected to a magnetic induction field (which creates aligning of the magnetic filler particles into polar position). Molding pressure of 5000 p.s.i. was applied at 350° F. for curing of compound for 10 to 15 minutes. The molded parts were removed from the mold and after cooling subjected to a magnetizing impulse charge. Such products produced from this method are known as cold type permanent magnets.

Example 7

Parts by weight
Plastisol with armberlite fibrous sheeting material
    as a binder or for preparing "Prepreg" type materials for molding:
    (1) Plastisol of Example 1 reduced with polysol
        to a 50:50 ratio _____ 500

(2) Amberlite loosely felted sheeting ⅛ to 1″ thickness approximately 2¾ oz. per sq. ft., (with a light binding agent to hold it together) available from Guston-Bacon Company, St. Louis, Mo.

Preparation: Material was placed in an impregnation tank and thoroughly wetted out, as it left the tank it was run through a pair of squeeze rolls to remove surplus material. This sheeting was then placed in a solvent removing oven until solvent was removed. At this stage impregnated material was subjected to convection heated air and gelled to a first stage. The material sheeting prepreg was then compression molded by pressure of about 200 p.s.i. or higher was used at a temperature of 350° F. for approximately 5 to 10 minutes.

Many other fibrous materials including creped paper and non-woven fibrous materials are suitable for this production method. The product of this example can be used as a fibrous board having thermoforming qualities for shaping or molding to any desired configuration.

Example 8

Polyester urethane foam having a pore size of about 50 was impregnated with the Example 1 plastisol having 20% polysol acetate added to reduce the viscosity. To carry this out the foam was run through an impregnating bath, then through a pair of squeeze rolls to force the plastisol evenly throughout the foam cells and then through another set of squeeze rolls to remove the surplus. Next the impregnated foam was subjected to a forced air heat source at 190° F. to remove the polysol. The material was then cured by application of 350° F. convection heat. This type of foam sheeting is highly insulative and its temperature deformation point is substantially increased; such material will be ideal for insulation under flooring for walk-in coolers, refrigerated box cars and trailers, etc.

Example 9.—Two-durometer composition

A sample of an automobile window vent handle was prepared from two different type materials. The lower portion was prepared from the Example 1 plastisol with 5% carbon black added for color. The softer upper portion consisting of the Example 1 plastisol without the X–970 monomer material. The vent handle was formed by extruding into a mold in two parts, first the plastisol for rigidity of the base is forced into mold, next the plastisol without X–970 is forced into mold and both materials are cored at a temperature of 350° F. for 4 to 5 minutes. The method of forming products such as vent handles in this manner is new and can be applied to many different applications such as, a wheel having the body and rim of the rigid material and having the tire portion of the flexible plastisol material. Such wheels are suitable for lawn mowers, golf carts, toy wagons, bicycles, etc.

Example 10.—Plywoodbase with simulated wood surface facing

This product was prepared from 3/16″ plywood sheet stock having a surface coating of a conventional vinyl primer (a phenol-vinyl resin type primer, such as Lakeside Vinyl Primer). The primer was applied to the plywood surface and baked for 3 minutes at 290° F. To the primed plywood sheet there next was applied a layer sheet of simulated printed, wood grained crepe paper which has been saturated with the plastisol of Example 1. The said plywood and impregnated crepe paper were then placed in a conventional type laminating press and bonded together at a temperature of 350° F. for approximately 5 minutes and a pressure of about 50 pounds per sq. inch.

Example 12.—High hardness foam—two component system

Part A: Parts by weight
(1) Plastisol of Example 1 _____ 50
(2) CaCo₃ filler and Al silicate _____ 25
(3) pH 9.5, micro size, ground limestone _____ 25

The above materials were blended together without deaerating.

Part B: Parts by weight
(1) Plastisol of Example 1 _____ 95
(2) (a) Phosphoric acid (12.5 parts) 
    (b) Boric acid (12.5 parts) } 5
    (c) Distilled water (75.0 parts)
(3) Silicone oil _____ .03

The boric acid was dissolved in the distilled water. Following this, the phosphoric acid was added. 520 Silicone oil was added to the mixture and dispersed. A&B materials react to form $CO_2$ gas under the influence of heat. The combined materials were then subjected to a temperature of 180° F. for approximately 3 minutes. The temperature was then raised to 350° F. for 5 minutes. This system produces a foam material of 16 to 18 pounds per cu. foot density with a shore D rating of 90. The product is of high heat resistance, high dielectric strength, as well as being resistant to solvents, acids, alkalies and abrasion. It is easily rotationally cast and slush molded, as well as being castable into blocks or buns as a light weight structural material or the like.

Example 13.—Flocked foam product

A flock material found suitable for use in this example was Du Pont 501 nylon flocking fibers. Other suitable materials would be cotton flock, short mixed color acrylan flocking fibers or the like. A layer of vinyl foam forming material (such as disclosed in Example 11) was coated onto a pattern aluminum sheet. This sheet was then passed under an electrostatic screen type flock applicator filled with flock, which applicator was vibrated to discharge the flocking downwardly to coat the liquid foam. Since the flock was given a negative charge by the vibrating screen (which is the negative pole on the electrostatic applicator) the flock fibers travel downward and are imbedded partially in the liquid foam. At this stage the flocked, liquid foam, coated sheet was expanded to cellular foam and cured by radiant heat (350° F. to 400° F. for approximately 5 minutes). This product may be used as synthetic carpet, matting or the like.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

1. A process of preparing a cross-linking and irreversible thermosetting polyvinyl chloride resin dispersion plastisol which process comprises mixing together at a temperature below about 50° F. a composition comprised of polyvinyl chloride resin, plasticizer, 1,3-butylene dimethacrylate monomeric ester, stabilizer, activator, ultraviolet protector, and optical brightener; wherein said composition is comprised of the following based on 500 parts by weight of polyvinyl chloride resin: between about 125 and about 225 parts plasticizer, between about 225 and about 125 parts 1,3-butylene dimethacrylate, about 10 parts stabilizer, about 5 parts activator, about ½ part ultraviolet absorber, and about ½ part optical brightener; said process being characterized in that said plasticizer is a mixture of butyl benzyl phthalate and a permanent plasticizer having the following properties:

Acidity _____ 0.60 meg./100 g. max.
Appearance _____ Clear, oily liquid.
Color, APHA _____ 150 max.
Moisture (KF in methanol) percent _____ 0.15 max.

| | |
|---|---|
| Odor | Slight characteristic. |
| Refractive index, (at 25° C.) | 1.4943. |
| Specific gravity (25/25° C.) | 1.046–1.052. |
| Density (lbs./gal. at 25° C.) | 8.72. |
| Pour point (° C.) | −1. |
| Viscosity cks: | |
| @25° C. | 556. |
| @37.8° C. | 243. |
| @98.9° C. | 21.2. |
| Flash point, ° F. | 4.75. |
| Fire point, ° F. | 535. |
| Solubility in water (25° C.) | Practically insoluble. | and said activator is a benzyl peroxide-tricresyl phosphate paste, said ultraviolet arsorber is 2(2'-hydroxy 5'-methylphenyl)benzotriazole, and said optical brightener is a 2-(stilbyl-4'')-(4,5-arylo)-1,2,3-triazole compound.

References Cited

UNITED STATES PATENTS

| | | | |
|---|---|---|---|
| 2,889,582 | 6/1959 | Cooper | 260—884 |
| 3,074,905 | 1/1963 | Douglas | 260—31.8 |
| 3,157,713 | 11/1964 | Leese | 260—884 |
| 3,247,289 | 4/1966 | Sears | 260—884 |
| 3,275,714 | 9/1966 | Thompson | 260—884 |

OTHER REFERENCES

Payne: Organic Coating Technology, vol. I, John Wiley & Sons, Inc., 1954, p. 518, Sci. Lib.

Penn: PVC Technology; Maclaren & Sons, Ltd., 1966, pp. 351–352; Sci. Lib.

MORRIS LIEBMAN, *Primary Examiner.*

L. T. JACOB, *Assistant Examiner.*